(12) United States Patent
Samuels et al.

(10) Patent No.: US 7,803,890 B2
(45) Date of Patent: *Sep. 28, 2010

(54) FLUOROCOPOLYMERS

(75) Inventors: George J Samuels, Williamsville, NY (US); Gregory J Shafer, Chaffee, NY (US)

(73) Assignee: Honeywell International Inc., Morristown, NJ (US)

( * ) Notice: Subject to any disclaimer, the term of this patent is extended or adjusted under 35 U.S.C. 154(b) by 70 days.

This patent is subject to a terminal disclaimer.

(21) Appl. No.: 11/960,360

(22) Filed: Dec. 19, 2007

(65) Prior Publication Data

US 2008/0153978 A1 Jun. 26, 2008

Related U.S. Application Data

(60) Provisional application No. 60/871,024, filed on Dec. 20, 2006.

(51) Int. Cl.
| | |
|---|---|
| *C08F 36/16* | (2006.01) |
| *C08F 136/16* | (2006.01) |
| *C08F 236/16* | (2006.01) |
| *C08F 14/18* | (2006.01) |
| *C08F 114/18* | (2006.01) |
| *C08F 214/18* | (2006.01) |

(52) U.S. Cl. .................. 526/252; 526/254; 526/255
(58) Field of Classification Search ............. 526/252, 526/255, 254
See application file for complete search history.

(56) References Cited

U.S. PATENT DOCUMENTS

| | | | |
|---|---|---|---|
| 2,559,640 A | 7/1951 | Kruger | |
| 2,915,510 A | 12/1959 | Hoyt | 260/87.7 |
| 2,917,497 A | 12/1959 | Honn | 260/87.5 |
| 2,919,263 A | 12/1959 | Kahrs et al. | |
| 2,931,840 A | 4/1960 | Marquis | |
| 2,970,988 A | 2/1961 | Lo | |
| 2,975,164 A | 3/1961 | Crawford | 260/87.5 |
| 2,996,555 A | 8/1961 | Rausch | |
| 3,053,818 A | 9/1962 | Honn et al. | |
| 3,085,996 A | 4/1963 | Lo | |
| 3,240,757 A | 3/1966 | Sterling | |
| 3,324,069 A | 6/1967 | Koblitz et al. | |
| 3,716,599 A | 2/1973 | Vasta | 260/859 |
| 3,812,066 A | 5/1974 | Stone et al. | |
| 3,847,881 A | 11/1974 | Mueller et al. | 260/80.77 |
| 3,893,987 A | 7/1975 | Chandrasekaran | 260/80.77 |
| 4,308,359 A | 12/1981 | Büning | 525/276 |
| 4,990,406 A | 2/1991 | Kappler et al. | 428/422 |
| 5,051,345 A | 9/1991 | Haraga et al. | 430/505 |
| 5,200,480 A | 4/1993 | Maruyama et al. | 526/249 |
| 5,292,816 A | 3/1994 | Metz et al. | 525/276 |
| 5,496,889 A | 3/1996 | Schlund et al. | 525/166 |
| 5,637,663 A * | 6/1997 | Anolick et al. | 526/254 |
| 6,342,569 B1 | 1/2002 | Manzoni et al. | 526/249 |
| 6,362,271 B1 | 3/2002 | Lin et al. | 524/520 |
| 6,486,281 B1 | 11/2002 | Kitada et al. | 526/264 |
| 6,548,719 B1 | 4/2003 | Nair et al. | 570/157 |
| 6,703,450 B2 | 3/2004 | Bauerle et al. | 525/326.3 |
| 6,867,273 B2 | 3/2005 | Lannuzel et al. | 526/250 |
| 7,253,236 B2 * | 8/2007 | Paglia et al. | 525/276 |
| 2008/0153977 A1 * | 6/2008 | Samuels et al. | 525/53 |

OTHER PUBLICATIONS

Crivello et al.; "*Transition Metal-Catalyzed Tandem Isomerization and Cationic Polymerization of Allyl Ethers. I. Discovery and Scope*"; J Polymer Sci A: Polym. Chem; (1997) 35; pp. 1593-1604.

* cited by examiner

*Primary Examiner*—Nathan M Nutter
(74) *Attorney, Agent, or Firm*—Bruce Bradford

(57) ABSTRACT

A process for the preparation of a fluoroolefin polymer, including the step of:
contacting in a reaction zone:
an initiator;
$CF_3CF=CH_2$, and optionally,
at least one ethylenically unsaturated comonomer capable of copolymerizing therewith;
wherein the contacting is carried out at a temperature, pressure and length of time sufficient to produce the fluoroolefin polymer.

23 Claims, No Drawings

FLUOROCOPOLYMERS

CROSS-REFERENCE TO A RELATED APPLICATION

The present application claims priority from U.S. Provisional Patent Application No. 60/871,024, filed Dec. 20, 2006, which is incorporated herein by reference.

BACKGROUND OF THE INVENTION

1. Field of the Invention

The present invention generally relates to a process for making fluoroolefin homopolymers, copolymers, terpolymers, and blends thereof, employing 2,3,3,3-tetrafluoropropene ($CF_3CF=CH_2$) as the fuoroolefin monomer and optionally, a comonomer capable of copolymerizing therewith. More particularly, the present invention relates to fluoroolefin homopolymers, copolymers, and terpolymers of 2,3,3,3-tetrafluoropropene ($CF_3CF=CH_2$), and blends thereof, prepared by the present process.

2. Description of the Prior Art

Fluorine-containing monomers, polymers and copolymers are described in U.S. Pat. Nos. 2,970,988, 2,931,840, 2996,555, 3,085,996, 6,486,281, 6,867,273 (see Column 3, line 29-50) and U.S. Pat. No. 6,703,450 (see Column 2, line 42, to Column 3, line 5, for monomers). Vinylidene fluoride copolymers are described in U.S. Pat. No. 3,893,987 (see Example 2) and process is described in U.S. Pat. No. 3,240,757. VDF/CTFE copolymers are described in U.S. Pat. Nos. 5,292,816 and 3,053,818 (see Example 6).

Other copolymers made from fluoroolefins are described in U.S. Pat. Nos. 3,812,066; 2,599,640; 6,342,569; 5,200,480; and 2,919,263.

Fluorocarbon/Acrylate Coatings are described in U.S. Pat. No. 3,716,599 and powder coating are described in U.S. Pat. No. 5,030,394.

Solvent based blending is described in U.S. Pat. No. 3,324,069. Polyvinylidene fluoride/polymethyl methacrylate blends are described in U.S. Pat. No. 6,362,271. Other blends are described in U.S. Pat. Nos. 5,051,345; 5,496,889 (Compatibilized Blends); U.S. Pat. No. 4,990,406 (F-terpolymer/acrylate blends). Graft Copolymers are described in U.S. Pat. No. 4,308,359.

Use of fluoro monomers as thermal stress-crack relievers is described in U.S. Pat. No. 3,847,881. 2-Chloropentafluoropropene is described in U.S. Pat. No. 2,915,510 (see Example 4); U.S. Pat. No. 2,917,497 (see Example 11); and U.S. Pat. No. 2,975,164 (see Example 7).

However, none of these references describes preparation of homopolymers, copolymers, terpolymers, and blends thereof, employing 2,3,3,3-tetrafluoropropene ($CF_3CF=CH_2$) prepared by the present process.

In view of the high cost of the fluoro polymers, there is a need in industry to develop a general and commercially feasible process for making such fluorine-containing polymers and exploring their properties and uses in various applications.

To achieve this objective, the present invention provides a practical process for making these polymers and exploring their properties and uses in various applications, including applications as sealants, gaskets, tubing, elastomers, waterproofing, and thermoplastic and thermoset coatings.

For this reason, the process according to the present invention is potentially useful commercially.

SUMMARY OF THE INVENTION

The present invention provides a process for the preparation of a fluoroolefin polymer using $CF_3CF=CH_2$, as the fluoroolefin monomer.

The process includes the step of:
contacting in a reaction zone:
an initiator;
$CF_3CF=CH_2$, and optionally,
at least one ethylenically unsaturated comonomer capable of copolymerizing therewith;
wherein the contacting is carried out at a temperature, pressure and length of time sufficient to produce the fluoroolefin polymer.

The present invention provides homopolymers and copolymers, terpolymers employing 2,3,3,3-tetrafluoropropene as well as blends of these homopolymers, copolymers, and terpolymers of 2,3,3,3-tetrafluoropropene ($CF_3CF=CH_2$).

These and other benefits of the present invention will become more evident from detailed description of the preferred embodiments that follow.

DETAILED DESCRIPTION OF THE PREFERRED EMBODIMENTS

The present invention provides a process for the preparation of a fluoroolefin polymer having the step of contacting in a reaction zone (1) an initiator; $CF_3CF=CH_2$, and optionally, at least one ethylenically unsaturated comonomer capable of copolymerizing therewith.

The step of contacting is carried out at a temperature, pressure and length of time sufficient to produce the fluoroolefin polymer.

In a preferred embodiment of the present process, the ethylenically unsaturated comonomer is selected from alkene of 2-8 carbon atoms, acrylate, methacrylate or α-trifluoromethylacrylate ester of 4 to 24 carbon atoms, hydroxyethyl acrylate, methacrylate or α-trifluoromethylacrylate, hydroxypropyl acrylate, methacrylate or α-trifluoromethylacrylate, glycidyl acrylate, methacrylate or α-trifluoromethylacrylate, acrylonitrile, methacrylonitrile, vinyl ether of 4 to 24 carbon atoms optionally substituted by at least one fluorine or hydroxy group, styrene, alpha-methylstyrene, paramethyl styrene, allyl alcohol, methallyl alcohol, vinyl acetate, vinyl carboxylate of 5-24 carbon atoms wherein the carboxylate is optionally substituted by at least one fluorine or hydroxy group, methyl ethyl ketone, hydroxyethyl vinyl ether, hydroxybutyl vinyl ether, alkyl vinyl ether, perfluoroalkyl vinyl ether, a fluoroolefin comonomer represented by the formula:

$$R^1R^2C=CR^3R^4$$

wherein each of $R^1$, $R^2$, $R^3$, and $R^4$ is independently selected from hydrogen, chloro, fluoro, hydroxy, alkoxy, alkoxycarbonyl, acyl, cyano, linear, branched or cyclic alkyl of 1-6 carbon atoms optionally substituted by at least one fluorine, aryl of 1-6 carbon atoms optionally substituted by at least one fluorine, with the proviso that at least one of the $R^1$, $R^2$, $R^3$, and $R^4$ groups is either fluorine or a fluorine-containing group, and a mixture thereof.

Examples of the fluoroolefin comonomer include $CFH=CH_2$, $CF_2=CH_2$, $CF_2=CFH$, $CF_2=CF_2$, $CClF=CF_2$, $CBrF=CF_2$, $CF_3CH=CHF$, $CF_3CF=CF_2$, $CF_3CH=CF_2$, E-$CF_3CF=CHF$, Z—$CF_3CF=CHF$, or mixture of E/Z isomers, $CF_3CH=CH_2$, $CF_3CF=CH_2$, $CF_3CBr=CF_2$, E/Z—$CF_3CH=CHCl$ as a mixture or individual isomers, $CF_3CCl=CH_2$, E/Z—$CF_3CCl=CHF$ as a mixture or individual isomers, $CF_3CCl=CF_2$, $CF_3CF=CHCl$ as a mixture or individual isomers, $CF_3CH=CFCl$ as a mixture or individual isomers, $(CF_3)_2C=CH_2$, $CF_3CF_2CF=CF_2$, $CF_3CF_2CH=CF_2$, $CF_3CF_2CF=CHF$, $CF_3CF_2CH=CH_2$, $CF_3CF_2CF=CH_2$, $CF_3CF_2CF_2CF=CF_2$, $CF_3CF_2CF_2CH=CF_2$, $CF_3CF_2CF_2CF=CHF$, $CF_3CF_2CF_2CH=CH_2$, $CF_3CF_2CF_2CF=CH_2$, $CF_3CH=CHCF_3$, $CF_3CH=CFCF_3$, $CF_3CF=CFCF_3$, $HOCH_2CH=CHF$, $HOCH_2CH=CF_2$, $HOCH_2CF=CH_2$, $HOCH_2CF=CHF$, $HOCH_2CF=CF_2$, $HOCH_2CF=CH_2$, $CF_3CF_2CF_2CF_2CH=CH_2$, $CF_3CF_2CF_2OCF=CF_2$, $CF_3CF_2CF_2CF_2CH=CH_2$, and mixtures thereof. Preferred monomers include $CFH=CH_2$, $CF_2=CH_2$, $CF_2=CFH$, $CF_2=CF_2$, $CClF=CF_2$, $CBrF=CF_2$, $CF_3CH=CHF$, $CF_3CF=CF_2$, $CF_3CH=CF_2$, E-$CF_3CF=CHF$, Z—$CF_3CF=CHF$, or mixture of E/Z isomers, and $CF_3CH=CH_2$.

Examples of the ethylenically unsaturated comonomer include alkene of 2-8 carbon atoms, acrylate or methacrylate ester of 4 to 24 carbon atoms, acrylonitrile, methacrylonitrile, vinyl ether, styrene, alpha-methylstyrene, paramethyl styrene, allyl alcohol, methallyl alcohol, vinyl acetate, vinyl carboxylate of 5-24 carbon atoms, methyl ethyl ketone, hydroxyethyl vinyl ether, hydroxybutyl vinyl ether, alkyl vinyl ether, perfluoroalkyl vinyl ether, and mixtures thereof.

Examples of the acrylic ethylenically unsaturated comonomer include methyl acrylate, ethyl acrylate, propyl acrylate, butyl acrylate, ethylhexylacrylate, octyl acrylate, dodecyl acrylate, stearyl acrylate, benzyl acrylate, phenyl acrylate, methylmethacrylate, ethylmethacrylate, butylmethacrylate, ethylhexymethacrylate, and mixtures thereof. Preferred acrylate or methacrylate ester comonomers include methyl acrylate, ethyl acrylate, hydroxyethyl acrylate, methacrylic acid, methyl methacrylate, ethyl methacrylate, and hydroxyethyl methacrylate.

The 2,3,3,3-tetrafluoropropene ($CF_3CF=CH_2$) monomer is preferably present from about 10 wt % to about 99 wt %, more preferably from about 10 wt % to about 90 wt %, and most preferably from about 20 wt % to about 85 wt % of the total weight of the polymer.

The ethylenically unsaturated comonomer is preferably present from about 90 wt % to about 2 wt %, more preferably present from about 90 wt % to about 10 wt %, still more preferably present from about 80 wt % to about 15 wt %, still yet more preferably present from about 70 wt % to about 30 wt %, and most preferably present from about 90 wt % to about 10 wt %, of the total weight of the polymer.

In a preferred embodiment of the present process, the ethylenically unsaturated comonomer comprises at least two comonomers, each being selected from the alkene of 2-8 carbon atoms, acrylate, methacrylate or α-trifluoromethylacrylate ester of 4 to 24 carbon atoms, hydroxyethyl acrylate, methacrylate or α-trifluoromethylacrylate, hydroxypropyl acrylate, methacrylate or α-trifluoromethylacrylate, glycidyl acrylate, methacrylate or α-trifluoromethylacrylate, acrylonitrile, methacrylonitrile, vinyl ether of 4 to 24 carbon atoms optionally substituted by at least one fluorine or hydroxy group, styrene, alpha-methylstyrene, paramethyl styrene, allyl alcohol, methallyl alcohol, vinyl acetate, vinyl carboxylate of 5-24 carbon atoms wherein the carboxylate is optionally substituted by at least one fluorine or hydroxy group, methyl ethyl ketone, hydroxyethyl vinyl ether, hydroxybutyl vinyl ether, alkyl vinyl ether, perfluoroalkyl vinyl ether, a fluoroolefin comonomer represented by the formula:

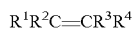

wherein each of $R^1$, $R^2$, $R^3$, and $R^4$ is independently selected from hydrogen, chloro, fluoro, hydroxy, alkoxy, alkoxycarbonyl, acyl, cyano, linear, branched or cyclic alkyl of 1-6 carbon atoms optionally substituted by at least one fluorine, aryl of 1-6 carbon atoms optionally substituted by at least one fluorine, with the proviso that at least one of the $R^1$, $R^2$, $R^3$, and $R^4$ groups is either fluorine or a fluorine-containing group, and a mixture thereof.

Specific examples of such ethylenically unsaturated comonomers are described herein above.

The 2,3,3,3-tetrafluoropropene ($CF_3CF=CH_2$) monomer and the ethylenically unsaturated comonomers can either be premixed and advantageously introduced as a single feed into the reaction zone, or they can be introduced as separate feeds into the reaction zone in such a ratio that the desired composition is obtained.

The 2,3,3,3-tetrafluoropropene ($CF_3CF=CH_2$) monomer starting material is known in the art and is generally available from commercial sources [Synquest Laboratories, PO Box 309, Alachua, Fla. 32616-0309 Catalog 2003]. Others can be prepared by known methods described in the chemical literature.

For example, $CF_3CH=CHF$ can be made in large scale from commercially available $CF_3CH_2CF_2H$ according to methods described in U.S. Pat. No. 6,548,719 B1. $CF_3CH_2CF_2H$ is produced by and is available from Honeywell International, Inc., Morristown, N.J.

Preferably, $CF_3CH=CF_2$ is formed from $CF_3CH_2CF_2H$ by chlorination followed by dehydrochlorination and $CF_3CH=CHF$ is formed from $CF_3CH_2CF_2H$ by dehydrofluorination.

The step of contacting is typically carried out at a temperature, pressure and length of time sufficient to produce the desired fluoroolefin polymer.

Thus, the contacting is preferably carried out at a temperature from about 10° C. to about 80° C. and more preferably from about 20° C. to about 60° C. The contacting is preferably carried out at a pressure from about 50 psig to about 500 psig and more preferably about 50 psig to about 500 psig. The contacting is preferably carried out for a length of time from about 4 hours to about 20 hours and more preferably from about 6 hours to about 12 hours. The above conditions vary depending upon the choice of monomers and initiator.

Another aspect of the process of the invention is use of selected free-radical initiators. Common initiators used for free radical polymerization of unsaturated monomers are generally satisfactory in the process of the invention depending on the nature and properties desired.

Examples of the initiator preferred for solutions include azobiscyanoacrylates, aliphatic peresters, such as, t-butyl peroctoate and t-amyl peroctoate, aliphatic peroxides, such as, tert-butyl peroxide, aliphatic hydroperoxides, such as, tert-butyl hydroperoxide, acylperoxides, percarbonates and mixtures thereof. Initiators or catalysts for bulk conditions includes those of solution methods but may consist only active metals in the presence of telogens such as perfluoroalkyl iodides. The persulfate initiator, which is preferred for emulsion and suspension polymerizations, is selected from sodium persulfate, potassium persulfate, ammonium persulfate, persulfate, and mixtures thereof. The use of persulfate with a catalyst or reducing agent such as a bisulfite are more preferred for emulsion or suspension polymerizations.

Generally, the initiator is used at a concentration of less than 20 weight percent based on the weight of the total monomers, usually the initiator is used at concentrations less than 2 weight percent, with a range of from 0.01 to 1.0 weight percent being preferred.

Preferably, the initiator is added to the reaction zone together with the monomeric reactants, as previously stated. However, a minor amount of peroxide as a finishing step may be added after the polymerization reaction has substantially ended. Such a finishing step has the purpose of removing minor amounts of unreacted monomers and aids in achieving a reaction zone product that may be used directly for the desired end use or application.

Thus, it is important that at least 50, and preferably at least 80, weight percent of the total peroxide to be added with the monomers and the balance of the initiator added at substantially during the polymerization reaction.

The polymerization process may be advantageously conducted in the presence of tertiary amine or a tertiary mercaptan-type chain transfer agent. Tertiary mercaptans are preferred chain transfer agents in the practice of the invention. The use of perfluoroalkyl chain transfer agents may be employed where other transfer agents pose contamination issues.

Generally, the chain transfer agent is used at a concentration of less than 30 weight percent based on the weight of monomers added to the reaction zone and more preferably at less than 5 weight percent.

The reaction zone preferably has provision for agitation and heat exchange to assist uniformity and process control.

The process can be carried out as a continuous, batch, vapor phase, fixed bed, solution, emulsion, or a suspension type of a polymerization process.

The reaction zone can further include a diluent, such as, a solvent or mixture of solvents. Preferably, non-polar, non-reactive, non-polymerizable, non-protic solvents are used as the reaction medium. However, other solvents, such as, non-interfering non-polymerizable liquid which is a solvent both for the monomers and copolymer products of the invention. 1,1,1-trichloroethane and mixtures thereof.

Suitable reaction solvents include esters, ketones, ethers, aliphatic hydrocarbons, aromatic hydrocarbons, chlorinated hydrocarbons, ethyl acetate, butylacetate, 1-methoxy-2-propanol acetate, toluene, xylene, methyl ethyl ketone, 2-heptanone, and 1,1,1-tri-chloroethane. Mixtures thereof can also be employed.

Copolymers containing a high content of 2,3,3,3 tetrafluoro-1-propene are soluble in organic solvents such as simple esters such as methyl acetate and ethyl acetate, ketones such as acetone, methyl ethyl ketone and methyl isobutyl ketone and THF. These solvents can be used to deposit films as well as clean surfaces of polymer.

In operation, preferably at least 10 wt % of the reactants are converted to the product. More preferably, up to at least 80 wt % of the reactants are converted to the product, and most preferably, at least 90 wt % of the reactants are converted to the product.

Operation of the process of the present invention under high conversion conditions is generally preferred, particularly under batch or solution, emulsion or suspension conditions. However, for continuous, vapor phase, or fixed bed reactions, the present process provides a unique advantage of recycling of the unreacted starting materials thereby providing a cost advantage over other known processes of the prior art.

Polymerization can be carried out essentially the same way as the methods known and described in the art, such as, the methods described in *J. Polymer Sci. A: Polym. Chem.* (1997) 35, 1593-1604, and in U.S. Pat. Nos. 2,970,988; 3,893,987 (see Example 2); U.S. Pat. Nos. 3,240,757; 5,292,816; 3,053, 818 (see Example 6); U.S. Pat. Nos. 3,812,066; 2,599,640; 6,342,569; 5,200,480; and 2,919,263.

Thus, the 2,3,3,3-tetrafluoropropene ($CF_3CF=CH_2$) monomer can be readily polymerized to form homopolymers under standard polymerization conditions known to a person skilled in the art.

Alternatively, the 2,3,3,3-tetrafluoropropene ($CF_3CF=CH_2$) monomer can be also readily polymerized to copolymers and terpolymers if one or more ethylenically unsaturated comonomer is present. Thus, a variety of polymers, such as, homopolymers, copolymers, and terpolymers can be prepared by the process of the present invention.

Accordingly, the present invention also provides polymer blends including at least two polymers selected from homopolymers, copolymers, and terpolymers prepared by the process of the present invention.

Depending on the nature of the ethylenically unsaturated comonomers, the composition of the copolymers and terpolymers, the polymerization conditions, and the molecular weights, the polymers can be obtained as colorless liquids or transparent or white powders.

The polymers, copolymers and terpolymers according to the present invention are useful in a variety of applications, including preparation of barrier materials and coatings.

The process can further include purifying the reaction product by precipitation or chromatography to obtain the product in substantially pure form.

The following non-limiting examples are illustrative of the various embodiments of the present invention.

It is within the ability of a person of ordinary skill in the art to select other variable from amongst the many known in the art without departing from the scope of the present invention.

Accordingly, these examples shall serve to further illustrate the present invention, not to limit them. Unless otherwise indicated, all parts and percentages are on a weight basis.

EXAMPLES

Example 1

Suspension type copolymerization of 50 mol % 50 mol % monomer combination. A typical polymerization is run in a stirred stainless steel autoclave in which reactants are added by methods known in the art. To a 50 mL autoclave is added $(NH_4)_2S_2O_8$-ammonium persulfate: 0.38 g dissolved in 10 mL of de-$O_2$/DI water. $Na_2S_2O_5$-sodium metasulfite: 0.8 g dissolved in 20 mL of de-$O_2$/DI water. $CuCl_2$-cupric chloride: 0.02 g dissolved in the $(NH_4)_2S_2O_8$ solution. $Na_2HPO_4$/$NaH_2PO_4$ buffer: 1.5 g/0.75 g dissolved addition solution. The solution is stirred while a mixture of 50 mol % 1234yf and 50 mol % of CTFE are added in which a autogenous pressure is obtained at 10° C. The pressure is kept during the polymerization as to obtain a constant concentration of monomer. After 8 hours, the polymerization is stopped and monomers are released from the autoclave. The polymerization suspension is poured out and dried. 30 grams of a white copolymer was obtained.

Example 2

Emulsion type compolymerization as a 95 mol % 15 mol % monomer combination. A typical polymerization is run in a stirred stainless steel autoclave in which reactants are added by methods known in the art. To a 300 mL autoclave is added $(NH_4)_2S_2O_8$-ammonium persulfate: 0.14 g dissolved in 10 mL of de-$O_2$/DI water. $Na_2S_2O_5$-sodium metasulfite: 0.3 g dissolved in 10 mL of de-$O_2$/DI water. $FeSO_4$-ferrous sulfate: 0.005 g dissolved buffer solution. $Na_2HPO_4$/$NaH_2PO_4$ buffer: 1.34/0.68 g dissolved 180 mL. $C_7F_{15}CO_2(NH_4)$ surfactant: 2.44 g dissolved with buffer. Add 180 mL of the emulsion solution (water/$Na_2HPO_4$/$NaH_2PO_4$/$FeSO_4$/$C_7F_{15}CO_2(NH_4)$). The solution is stirred while 40 g as a mixture of 5 mol % 1234yf and 95 mol % of CTFE are added in which an autogenous pressure is obtained at 10° C. The pressure is kept during the polymerization to obtain a constant concentration of monomer. After 4 hours, the polymerization is stopped and monomers are released from the autoclave. The polymerization latex was coagulated in 25% HCl and the polymer was washed and dried. 16 grams of a white copolymer was obtained.

Example 3

Emulsion type terpolymerization. A typical polymerization is run in a stirred stainless steel autoclave in which reactants are added by methods known in the art. To a 300 mL autoclave is added $(NH_4)_2S_2O_8$-ammonium persulfate: 22 mL of a solution of 1.12 g dissolved in 40 mL of de-$O_2$/DI water. $Na_2S_2O_5$-sodium metasulfite: 12.5 mL of a solution of 2.4 g dissolved in 40 mL of de-$O_2$/DI water. $FeSO_4$-ferrous sulfate: 0.005 g dissolved buffer solution. $Na_2HPO_4$/$NaH_2PO_4$ buffer: 1.34/0.68 g dissolved 180 mL. $C_7F_{15}CO_2(NH_4)$ surfactant: 2.44 g dissolved with buffer. Add 180 mL of the emulsion solution (water/$Na_2HPO_4$/$NaH_2PO_4$/$FeSO_4$/$C_7F_{15}CO_2(NH_4)$). During the polymerization, a mixture of the solution is stirred while 62.4 g as a mixture of 10.1 mol % 1234yf and 88.1 mol % of CTFE and 1.8 mol % VDF are added and an autogenous pressure is obtained at 10° C. The pressure is kept during the polymerization to obtain a constant concentration of monomer. After 6 hours, the polymerization is stopped and monomers are released from the autoclave. The polymerization latex was coagulated in 25% HCl and polymer was washed and dried. 26 grams of a white terpolymer was obtained.

Polymerization of any combination of monomers may be combined in any combination to afford the properties suitable for the intended application or applications. Those skilled in the art may change the polymerization medium, catalyst, initiator system, temperature, pressure, monomer mole ratio and concentration to provide a suitable homopolymer, copolymer, terpolymer or others.

Example 4

Emulsion copolymerization of 1234yf and VDF. A typical polymerization is run in a stirred stainless steel autoclave in which reactants are added by methods known in the art. To a 30 mL autoclave is added $(NH_4)_2S_2O_8$-ammonium persulfate: 0.14 g dissolved in 1.0 mL of de-$O_2$/DI water $Na_2S_2O_5$-sodium metasulfite: 0.3 g dissolved in 1.0 mL of de-$O_2$/DI water. $FeSO_4$-ferrous sulfate: 0.005 g dissolved buffer solution. $Na_2HPO_4$/$NaH_2PO_4$ buffer: 1.34/0.68 g dissolved 180 mL. $C_7F_{15}CO_2(NH_4)$ surfactant: 2.44 g dissolved with buffer. Add 18 mL of the emulsion solution (water/$Na_2HPO_4$/$NaH_2PO_4$/$FeSO_4$/$C_7F_{15}CO_2(NH_4)$). During the polymerization, a mixture of the solution is stirred while 9.5 g as a mixture of 10 mol % 1234yf and 90 mol % of VDF are added and an autogenous pressure is obtained at 10° C. The pressure is kept during the polymerization to obtain a constant concentration of monomer. After 48 hours, the polymerization is stopped and monomers are released from the autoclave. The polymerization latex was coagulated in 25% HCl and polymer was washed and dried. 2.3 grams of a white copolymer were obtained.

The present invention has been described with particular reference to the preferred embodiments. It should be understood that variations and modifications thereof can be devised by those skilled in the art without departing from the spirit and scope of the present invention. Accordingly, the present invention embraces all such alternatives, modifications and variations that fall within the scope of the appended claims.

What is claimed is:

1. A process for the preparation of a fluoroolefin polymer, comprising the step of:
    contacting in a reaction zone:
    an initiator;
    $CF_3CF=CH_2$, and
    at least one ethylenically unsaturated comonomer selected from the group consisting of acrylate, methacrylate or α-trifluoromethylacrylate ester of 4 to 24 carbon atoms, hydroxyethyl acrylate, methacrylate or α-trifluoromethylacrylate, hydroxypropyl acrylate, methacrylate or α-trifluoromethylacrylate, glycidyl acrylate, methacrylate or α-trifluoromethylacrylate, and acrylonitrile, methacrylonitrile, wherein said contacting is carried out at a temperature, pressure and length of time sufficient to produce said fluoroolefin polymer.

2. The process of claim 1, wherein said reaction zone further comprises a solvent selected from the group consisting of: esters, ketones, ethers, aliphatic hydrocarbons, aromatic hydrocarbons, chlorinated hydrocarbons, ethyl acetate, butylacetate, 1-methoxy-2-propanol acetate, toluene, xylene, methyl ethyl ketone, 2-heptanone, and 1,1,1-tri-chloroethane, and mixtures thereof.

3. The process of claim 1, wherein said ethylenically unsaturated comonomer is selected from the group consisting of: methyl acrylate, ethyl acrylate, propyl acrylate, butyl acrylate, ethylhexylacrylate, octyl acrylate, dodecyl acrylate, stearyl acrylate, benzyl acrylate, phenyl acrylate, methylmethacrylate, ethylmethacrylate, butylmethacrylate, ethylhexymethacrylate, and mixtures thereof.

4. The process of claim 3, wherein said ethylenically unsaturated comonomer is selected from the group consisting of: methyl acrylate, ethyl acrylate, hydroxyethyl acrylate, methacrylic acid, methyl methacrylate, ethyl methacrylate, and hydroxyethyl methacrylate.

5. The process of claim 1, wherein the $CF_3CF=CH_2$ monomer is from about 10 wt % to about 99 wt % of the total weight of the polymer.

6. The process of claim 1, wherein the $CF_3CF=CH_2$ monomer is from about 20 wt % to about 85 wt % of the total weight of the polymer.

7. The process of claim 1, wherein the $CF_3CF=CH_2$ monomer is from about 30 wt % to about 70 wt % of the total weight of the polymer.

8. The process of claim 1, wherein said ethylenically unsaturated comonomer is from about 70 wt % to about 30 wt % of the total weight of the polymer.

9. The process of claim 1, wherein said ethylenically unsaturated comonomer comprises at least two ethylenically unsaturated comonomers.

10. The process of claim 1, wherein said contacting is carried out at a temperature from about 10° C. to about 80° C.

11. The process of claim 1, wherein said contacting is carried out at a temperature from about 20° C. to about 60° C.

12. The process of claim 1, wherein said contacting is carried out at a pressure from about 50 psig to about 500 psig.

13. The process of claim 1, wherein said contacting is carried out at a pressure from about 80 psig to about 260 psig.

14. The process of claim 1, wherein said contacting is carried out at a length of time from about 4 hours to about 20 hours.

15. The process of claim 1, wherein said contacting is carried out at a length of time from about 6 hours to about 12 hours.

16. The process of claim 1, wherein said initiator is selected from the group consisting of: azobiscyanoacrylates, aliphatic peresters, aliphatic peroxides, aliphatic hydroperoxides, acylperoxides, persulfates, percarbonates, active metals in the presence of telogens and mixtures thereof.

17. The process of claim 1, wherein said persulfate initiator is selected from the group consisting of: sodium persulfate, potassium persulfate, ammonium persulfate, iron persulfate, and a mixture thereof.

18. The process of claim 1, carried out as a continuous, batch, vapor phase, or a fixed bed process.

19. The process of claim 1, carried out as a solution, emulsion, or suspension polymerization process.

20. A homopolymer of $CF_3CF=CH_2$ prepared by the process of claim 1.

21. A copolymer prepared by the process of claim 1.

22. A terpolymer prepared by the process of claim 1.

23. A polymer blend comprising at least two polymers selected from the group consisting of: a homopolymer, copolymer, and terpolymer prepared by the process of claim 1.

* * * * *